Aug. 11, 1953    R. K. CUTTER    2,648,333
DRIP METER
Filed Sept. 17, 1951
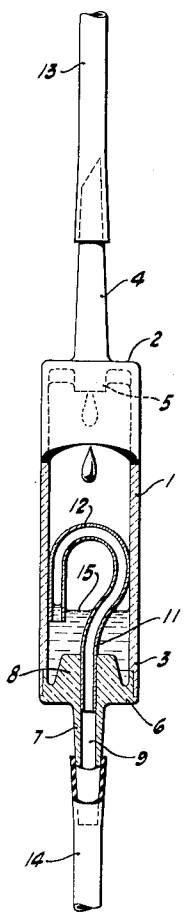
INVENTOR.
ROBERT K. CUTTER
BY
Melkin and Hanscom
ATTORNEYS Patented Aug. 11, 1953

2,648,333

UNITED STATES PATENT OFFICE 2,648,333

DRIP METER

Robert K. Cutter, Berkeley, Calif., assignor to Cutter Laboratories, Berkeley, Calif., a corporation of California Application September 17, 1951, Serial No. 247,001

2 Claims. (Cl. 128—214)

This invention relates to and in general has for its object the provision of a drip meter for use in making intravenous injections.

Drip meters are currently used when making intravenous injections for the purpose of determining the rate at which the injection is proceeding and the character of the solution being injected. Basically such meters consist of a transparent cylindrical chamber inserted in the injection line and provided intermediate its ends with a downwardly extending nipple from which the solution drips. In making intravenous injections the introduction of air into the circulatory system should of course be avoided, but as meters are presently constructed this is very difficult to do without manipulation.

More specifically the object of this invention is the provision of a drip meter wherein communication to its outlet is had through an upstanding goose neck serving to prevent the introduction of air from the drip meter chamber to the outlet.

The invention possesses other advantageous features, some of which, with the foregoing, will be set forth at length in the following description where that form of the invention which has been selected for illustration in the drawings accompanying and forming a part of the specification is outlined in full.

Referring to the drawings:

The single figure illustrated is a side elevation of a drip meter embodying the objects of my invention and wherein the lower portion thereof is shown in section the better to illustrate its construction.

As shown in this figure, the meter includes a transparent cylindrical chamber 1 having a closed upper end 2 and an open lower end 3. Formed integral with the upper end 2 is an upwardly extending tapered inlet stem 4 terminating at its base and within the confines of the upper end of the chamber 1, in a drip nipple 5.

Snugly fitted on the lower end of the chamber 1 and adapted to be sealed thereto is a cap 6 provided with a downwardly extending outlet stem 7, with an upwardly extending boss 8 and formed with a central hole 9. Extending into the upper end of the hole 9 in sealing engagement with the cap 6 is a section 11 of flexible plastic tubing, the free end thereof being bent into a downwardly extending goose neck 12.

To put this device in operation the inlet stem 4 is connected through the line 13 with a source of blood or other intravenous solution and the outlet stem 7 is connected with a line 14 provided at its free end with a needle. As the solution flows through the nipple 5 into the chamber 1, the level 15 of the solution within the chamber rises and becomes fixed at about $\frac{1}{16}''$ above the lower free end of the goose neck 12. At this point the solution passes through and fills the goose neck, the stem 7 and the line 14 and in so doing displaces all of the air contained therein. When the line 14 has been completely filled with solution it is ready for use without danger of the entrainment of air into the solution as the solution passes through the meter.

From the above description it will be seen that I have provided a drip meter which can be readily cleared of air preparatory to its actual use without the necessity of inverting it or in any other way manipulating it and that when in operation there is no danger of entrapping air in the solution being administered.

I claim:

1. A drip meter for injection equipment comprising: a chamber provided at its upper end with a fluid inlet connection and at its lower end with a fluid outlet connection; a drip nipple located within said chamber in communication with said inlet connection; and a section of tubing disposed within said chamber with its lower end in communication with said outlet connection, said section being bent into a downwardly extending portion.

2. A drip meter for injection equipment comprising: a chamber provided with a fluid inlet connection and at its lower end with a fluid outlet connection; a drip nipple located within the upper end of said chamber in communication with said inlet connection; and a section of tubing disposed within said chamber with its lower end in communication with said outlet connection, said section being reversely bent into a downwardly extending goose neck.

ROBERT K. CUTTER.

References Cited in the file of this patent

UNITED STATES PATENTS

| Number | Name | Date |
|---|---|---|
| 2,129,983 | Bacon | Sept. 13, 1938 |
| 2,542,461 | Bay | Feb. 20, 1951 |